United States Patent
Salamone et al.

(10) Patent No.: US 7,390,863 B2
(45) Date of Patent: Jun. 24, 2008

(54) POLYMERIC MATERIALS HAVING ENHANCED ION AND WATER TRANSPORT PROPERTY AND MEDICAL DEVICES COMPRISING SAME

(75) Inventors: Joseph C. Salamone, Fairport, NY (US); Jay F. Kunzler, Canandaigua, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 381 days.

(21) Appl. No.: 11/215,292

(22) Filed: Aug. 30, 2005

(65) Prior Publication Data

US 2007/0049713 A1    Mar. 1, 2007

(51) Int. Cl.
C08F 290/06 (2006.01)
C08F 230/08 (2006.01)
C08F 16/16 (2006.01)
G02B 1/04 (2006.01)
C08G 77/04 (2006.01)

(52) U.S. Cl. ............ 526/279; 526/296; 526/332; 523/106; 523/107

(58) Field of Classification Search .......... 523/106, 523/107; 526/279, 332; 528/25
See application file for complete search history.

(56) References Cited

U.S. PATENT DOCUMENTS

| | | | |
|---|---|---|---|
| 3,228,741 A | 1/1966 | Becker | |
| 3,341,490 A | 9/1967 | Burdick et al. | |
| 3,808,178 A | 4/1974 | Gaylord | |
| 3,996,187 A | 12/1976 | Travnicek | |
| 3,996,189 A | 12/1976 | Travnicek | |
| 4,055,378 A | 10/1977 | Feneberg et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,168,112 A | 9/1979 | Ellis et al. | |
| 4,214,014 A | 7/1980 | Hofer et al. | |
| 4,287,175 A | 9/1981 | Katz | |
| 4,312,575 A | 1/1982 | Peyman et al. | |
| 4,321,261 A | 3/1982 | Ellis et al. | |
| 4,327,203 A | 4/1982 | Deichert et al. | |
| 4,355,147 A | 10/1982 | Deichert et al. | |
| 4,436,730 A | 3/1984 | Ellis et al. | |
| 4,632,844 A | 12/1986 | Yanagihara et al. | |
| 4,652,399 A * | 3/1987 | Herweh | 252/519.2 |
| 4,740,533 A | 4/1988 | Su et al. | |
| 4,910,277 A | 3/1990 | Bambury et al. | |
| 4,954,587 A | 9/1990 | Mueller | |
| 5,010,141 A | 4/1991 | Mueller | |
| 5,028,721 A | 7/1991 | Gibson et al. | |
| 5,034,461 A | 7/1991 | Lai et al. | |
| 5,070,169 A | 12/1991 | Robertson et al. | |
| 5,070,215 A | 12/1991 | Bambury et al. | |
| 5,079,319 A | 1/1992 | Mueller | |
| 5,260,000 A | 11/1993 | Nandu et al. | |
| 5,270,418 A | 12/1993 | Kunzler et al. | |
| 5,310,779 A | 5/1994 | Lai | |
| 5,321,108 A | 6/1994 | Kunzler et al. | |
| 5,358,995 A | 10/1994 | Lai et al. | |
| 5,387,662 A | 2/1995 | Kunzler et al. | |
| 5,397,848 A | 3/1995 | Yang et al. | |
| 5,449,729 A | 9/1995 | Lai | |
| 5,512,205 A | 4/1996 | Lai | |
| 5,700,559 A | 12/1997 | Sheu et al. | |
| 5,705,583 A | 1/1998 | Bowers et al. | |
| 5,710,302 A * | 1/1998 | Kunzler et al. | 556/434 |
| 5,779,943 A | 7/1998 | Enns et al. | |
| 5,807,636 A | 9/1998 | Sheu et al. | |
| 5,807,944 A | 9/1998 | Hirt et al. | |
| 5,849,811 A | 12/1998 | Nicolson et al. | |
| 6,550,915 B1 | 4/2003 | Grobe, III | |
| 6,794,456 B2 | 9/2004 | Grobe, III | |
| 6,815,074 B2 * | 11/2004 | Aguado et al. | 428/447 |
| 6,815,554 B2 | 11/2004 | Pfeiffer et al. | |
| 6,867,274 B2 | 3/2005 | Maughon et al. | |
| 6,908,681 B2 | 6/2005 | Terry et al. | |
| 6,913,798 B2 | 7/2005 | Kitamura et al. | |

FOREIGN PATENT DOCUMENTS

| | | | |
|---|---|---|---|
| EP | 0267158 B1 | 5/1988 | |
| EP | 0330615 B1 | 8/1989 | |
| EP | 0330616 B1 | 8/1989 | |
| EP | 0330617 B1 | 8/1989 | |
| WO | WO 96/31792 A1 | 10/1996 | |

(Continued)

OTHER PUBLICATIONS

Herweh, J.E., "Synthesis, Characterization, and Complexing Properties of a Polymethacrylate Bearing Pendant Macroheterocyclic Structures," Journal of Polymer Science, John Wiley & Sons, Inc., p. 2767-2778, (Aug. 25, 1985).

McDaniel, Christopher W., "Preparation of Crown Compounds Containing Allyloxymethyl or Butenyl Groups for Attachment to Silica Gel or Containing Long Chain Lipophilic Groups for Use in Liquid Membrane Systems," J. Heterocyclic Chem., p. 413-419, (Aug. 8, 1988).

Ikeda, Isao, "Synthesis of Substituted Crown Ethers from Oligoethylene Glycols," Journal of Org. Chem., Amer. Chem. Soc., p. 5355-5358, (Aug. 19, 1980).

Tiemblo, P., et al., "Gas Transport Properties of Crown-Ether Methacylic Polymers: Poly(1,4,7,10-tetraoxacyclododecan-2-yl) Methyl Methacrylate," Polymer, p. 6773-6780, (Feb. 25, 2003).

Nakatsuji, Yohji, et al., "Synthesis and Polymerization of N-Acryloyl- and N-Methacryloylaminomethyl Crown Ethers," Makromol. Chem., p. 105-109, (Aug. 25, 1986).

(Continued)

*Primary Examiner*—Mark Eashoo
*Assistant Examiner*—Michael Pepitone
(74) *Attorney, Agent, or Firm*—Joseph Barrera

(57) ABSTRACT

A polymeric material having enhanced oxygen permeability and ion and water transport rates comprises units of a first monomer and a second monomer, which comprises linear poly(ethylene oxide), cyclic poly(ethylene oxide), or combinations thereof. Medical devices, such as ophthalmic devices, are made from such polymeric materials.

20 Claims, No Drawings

OTHER PUBLICATIONS

Bilba, Doina, et al., "Chelating Sorbents in Inorganic Chemical Analysis," Croatica Chemica Acta, vol. 71 (No. 1), p. 155-178, (Aug. 25, 1998).

Bonanno, Joseph A., "Identity and Regulation of Ion Transport Mechanisms in the Corneal Endothelium," Prog. in Retinal and Eye Res., p. 69-94, (Aug. 25, 2003).

Christensen, et al., "The Synthesis and Ion Binding of Synthetic Multidentate Macrocyclic Compounds," Chem. Rev., p. 351, (Aug. 25, 1974).

Lindoy, et al., "Transition Metal Complexes of Synthetic Macrocyclic Ligands," Chem. Soc. Rev., p. 421, (Aug. 25, 1975).

Bradshaw, et al., "Macrocyclic Sulfide Syntheses: A Review (1)," J. Heterocycl. Chem., p. 649, (Aug. 25, 1974).

Christensen, et al., "Ion Binding by Synthetic Macrocyclic Compounds," Science, p. 459, (Aug. 25, 1971).

Pedersen et al., "Macrocyclic Polyethers and Their Complexes," Angew. Chem. Int. Ed. Engl., p. 16, (Aug. 25, 1972).

Lai, Yu-Chin, "The Role of Bulky Polysiloxanylalkyl Methacrylates in Polyurethane-Polysiloxane Hydrogels," J. of Applied Polymer Science, p. 1193-1199, (Aug. 25, 1996).

Hodson, Stuart, et al., "The Electrogenic Pump of Rabbit Corneal Endothelium", Exp. Eye Res., 24, p. 249-253 (1977).

\* cited by examiner

POLYMERIC MATERIALS HAVING ENHANCED ION AND WATER TRANSPORT PROPERTY AND MEDICAL DEVICES COMPRISING SAME

BACKGROUND OF THE INVENTION

The present invention relates to polymeric materials having enhanced ion and water transport property, medical devices comprising such materials, and methods of making such materials and devices. In particular, the present invention relates to ophthalmic devices having enhanced ion and water transport property.

Advances in chemistry of materials for medical devices have increased their compatibility with a body environment and the comfort for their extended use therein. The extended use of contact lenses requires that materials for these lenses allow sufficient rates of transport of oxygen to the cornea to preserve its health because the cornea does not have blood vessels for the supply of oxygen and must receive this gas by its diffusion through the epithelial layer on the outer surface of the cornea. On the other hand, the cornea continuously regulates its thickness by actively pumping ions in or out of the cornea to counterbalance a continuous leak of fluid into the corneal stroma. A net flux of sodium ions from the stroma to the anterior chamber has been measured in animal models (see, e.g., S. Hodson et al., *Exp. Eye Res., Vol.* 11, 249-253 (1977); J. A. Bonanno, *Prog. in Retinal and Eye Res.,* Vol. 22, 69-94 (2003)). Thus, contact lenses for extended use also should allow sufficient rates of ion transport therethrough. Moreover, in view of the need rapidly to regulate the cornea thickness, the desirable materials should have an ion transport rate as high as possible. Although materials have been developed that show high oxygen permeability, those having remarkable ion permeability have not been noticed.

While there exist rigid gas permeable ("RGP") contact lenses, which have high oxygen permeability and which move on the eye, RGP lenses are typically quite uncomfortable for the wearer. Thus, soft contact lenses are preferred by many wearers because of comfort. (Soft materials are those exhibiting low modulus of elasticity, such as less than about 150 g/mm$^2$.) Moreover, a contact lens which may be continuously worn for a period of a day or more (including wear during periods of sleeping) requires comfort levels that exclude RGP lenses as popular extended-wear candidates. Among the soft contact lens materials having high oxygen permeability have been polymers containing siloxane groups. For example, see U.S. Pat. Nos. 3,228,741; 3,341,490; 3,996,187; and 3,996,189. However, polysiloxanes are typically highly hydrophobic and lipophilic. The properties (e.g., lipophilicity, glass transition temperature, mechanical properties) of known polysiloxanes have resulted in contact lenses which adhere to the eye, inhibiting the necessary lens movement. In addition, polysiloxane lipophilicity promotes adhesion to the lens of lipids and proteins in the tear fluid, causing a haze, which interferes with vision through the lens.

Therefore, there have been efforts to develop hydrophilic polymers, which have both high hydrophilicity and high oxygen permeability. Such polymers typically combine a hydrophilic monomer (such as 2-hydroxyethyl methacrylate ("HEMA"), N-vinyl-2-pyrrolidone ("NVP"), N,N-dimethyl acrylamide ("DMA"), methacrylic acid "MAA"), or acrylic acid) and units of siloxane-containing monomers. For example, see U.S. Pat. Nos. 3,808,178; 4,136,250; and 5,070, 169. These polymers typically are random copolymers. Other works have been directed to develop block copolymers, such as those consisting of polysiloxane and polyoxyalkylene blocks. See, for example, EP 267158, EP 330615, EP 330616, and EP 330617.

Although there have been attempts to develop materials for contact lenses that have both high oxygen permeability and high ion transport rate, such materials have not been apparent. For example, U.S. Pat. Nos. 5,807,944 and 5,849,811 disclose polymers comprising blocks or segments of polymers having high oxygen permeability and blocks or segments of polymers that are said to have high ion permeability. The oxygen-permeable blocks comprise a siloxane-containing macromonomer, such as polydimethylsiloxane that may include hydrophilic groups. The ion-permeable blocks comprise units of a typical hydrophilic monomer that has been used to synthesize hydrophilic polymers, including the monomers disclosed above or cyclic ethers having only one oxygen atom in the ring. Although a range of ion diffusion rates through these materials was achieved, these rates may still be inadequate for the cornea health, and higher rates are still desirable.

Therefore, there is a continued need to provide other materials for medical devices in general, and contact lenses in particular, that have both improved oxygen permeability and ion transport rate. It is also very desirable to provide materials for such devices that have improved oxygen permeability and ion and water transport rates.

SUMMARY OF THE INVENTION

In general, the present invention provides a polymeric material that has an improved oxygen permeability and ion transport rate.

In one aspect, the present invention provides a polymeric material that has an improved oxygen permeability and ion and water transport rates.

In another aspect, the oxygen permeability and the ion and water transport rates of the polymeric material are controlled.

In still another aspect, the polymeric material comprises units of a polymerizable linear poly(ethylene oxide), cyclic poly(ethylene oxide), or combinations thereof.

In still another aspect, the polymeric material comprises units of a first monomer and units of a polymerizable linear poly(ethylene oxide), cyclic poly(ethylene oxide), or combinations thereof.

In still another aspect, the polymeric material comprises a first block or segment comprising units of a first monomer and a second block or segment comprising units of second monomer, wherein the second monomer comprises polymerizable linear poly(ethylene oxide), cyclic poly(ethylene oxide), or combinations thereof.

In yet another aspect, the present invention provides a medical device comprising a polymeric material that comprises units of a polymerizable linear poly(ethylene oxide), cyclic poly(ethylene oxide), or combinations thereof.

In a further aspect, the medical device is an ophthalmic device.

In still another aspect, the present invention provides a method for making a polymeric material that has an improved oxygen permeability and ion and water transport rates. The method comprises polymerizing a first monomer and a second monomer that comprises a polymerizable linear poly (ethylene oxide), cyclic poly(ethylene oxide), or combinations thereof.

In still another aspect, the first monomer comprises a siloxane-containing unit.

Other features and advantages of the present invention will become apparent from the following detailed description and claims.

DETAILED DESCRIPTION

Definitions

The term "lower alkyl" means an alkyl group having any number of carbon atoms from 1 to, and including, 10 (e.g., 1, 2, 3, 4, 5, 6, 7, 8, 9, or 10). A lower alkyl group can be a linear (e.g., having 1-10 carbon atoms), branched (e.g., having 3-10 carbon atoms), or cyclic (e.g., having 3-10 carbon atoms) alkyl.

The phrase "from i to j" (wherein i and j are integers) means the range from i to, and including, j.

The term "(meth)acrylate" includes acrylate and methacrylate. Similar meanings apply to other analogous terms of "(meth)acrylate."

In general, the present invention provides a polymeric material that has an improved oxygen permeability and ion transport rate.

In one aspect, the present invention provides a polymeric material that has an improved oxygen permeability and ion and water transport rates.

In another aspect, the polymeric material comprises units of a polymerizable linear poly(ethylene oxide) having one or more polymerizable groups. In another aspect, the polymeric material comprises units of a first monomer and units of a polymerizable linear poly(ethylene oxide) having one or more polymerizable groups. For example, a suitable polymerizable linear poly(ethylene oxide) has a formula of

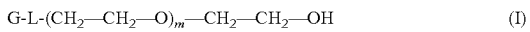

G-L-(CH₂—CH₂—O)_m—CH₂—CH₂—OH     (I)

wherein m is an integer in the range from 1 to 1000, L is direct bond or a divalent linking group, and G is a polymerizable group. In one embodiment, m is in the range from 10 to 500. Alternatively, m is in the range from 10 to 300, or from 10 to 200. Non-limiting examples of the polymerizable group G are vinyl, allyl, acryloyl, acryloyloxy, methacryloyl, methacryloyloxy, epoxide, isocyanate, isothiocyanate, amino, hydroxyl, alkoxy, mercapto, anhydride, carboxylic, fumaryl, styryl, itaconyl, maleimido, methacrylamido, acrylamido, and combinations thereof. Linear poly(ethylene oxide) having varying chain length and polymerizable groups are commercially available.

In another aspect, the polymeric material comprises units of a polymerizable cyclic poly(ethylene oxide) having a formula of

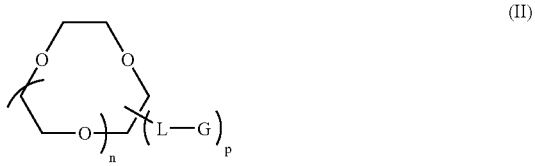

(II)

wherein n is an integer in the range from 1 to, and including, 15 (e.g., from 1 to 8, or from 1 to 6, or from 2 to 6, or from 2 to 4); p is an integer in the range from 1 to, and including, 10 (e.g., from 1 to 5, or from 1 to 3); L is direct bond or a divalent linking group; and G is a polymerizable group. In one embodiment, G is selected from the group consisting of the polymerizable groups disclosed above.

In another embodiment, the L group in either Formula I or II is a linear, or branched, or cyclic divalent linking group comprising carbon and hydrogen and, optionally, an atom selected from the group consisting of oxygen, nitrogen, halogen, phosphorus, sulfur, silicon, and combinations thereof (for example, L can be selected from the group consisting of divalent hydrocarbon groups (e.g., linear, branched, or cyclic $C_1$-$C_{20}$ hydrocarbon groups or $C_6$-$C_{36}$ aromatic groups; preferably, $C_1$-$C_{10}$; and more preferably $C_1$-$C_6$ hydrocarbon groups), —(O(CH₂)_i)_j-, —(OCH(CH₃)CH₂)_j-, —((CH₂)_i OCH₂)_j-, —(CH(CH₃)CH₂OCH₂)_j-, —(CH₂CH(CH₃) OCH₂)_j-, and —(O(CH₂)_i)_j—(O(CH₂)_i—CHOH—CH₂)_j)_k— group, and combinations thereof with a hetero atom selected from the group consisting of nitrogen, halogen, phosphorus, sulfur, and silicon; i is 2, 3, or 4; j and k are independently selected and are positive integers in the range from 1 to, and including, 10.

Although the applicants do not wish to be bound by any one particular theory, it is believed that the plurality of ethylene oxide groups forms complexes with a variety of cations and assists the transport of the same through the polymeric material. The polar nature of the ethylene oxide groups also facilitates the transport of water through the same polymeric material.

Cyclic poly(ethylene oxide) compounds, which are macrocyclic polyethers, also known as crown ethers, are capable of selectively forming complexes with a variety of cations. The ability of a crown ether molecule to complex with a cation is dependent upon the size of the hole formed by the macrocyclic structure, and as a result, crown ethers of different sizes exhibit different specificities for the complexation of cations. Crown ethers having 5, 6, 7, or 8 oxygen atoms for forming complexes with cations typically found in biological environment are suitable in a polymeric material of the present invention. These crown ethers are popularly known as 15-crown-5 (1,4,7,10,13-pentaoxacyclopentadecane), 18-crown-6 (1,4,7,10,13,16-hexaoxacyclooctadecane), 21-crown-7 (1,4,7,10,13,16,19-heptaoxacyclohenicosane), and 24-crown-8 (1,4,7,10,13,16,19,22-octaoxacyclotetracosane).

Non-limiting examples of polymerizable crown ethers for including in a polymeric material of the present invention are

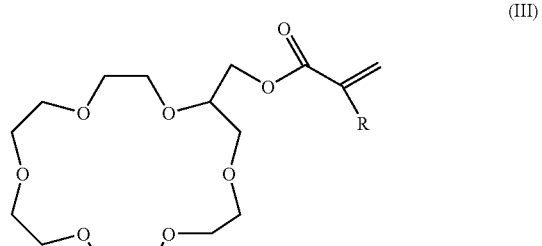

(III)

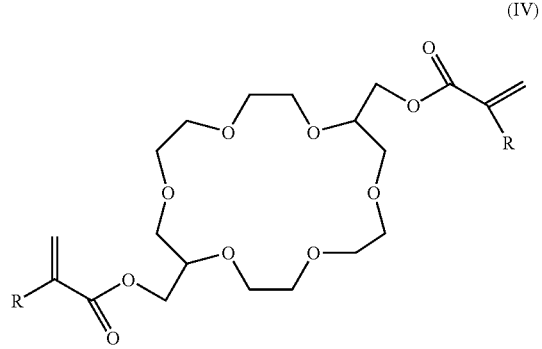

(IV)

-continued

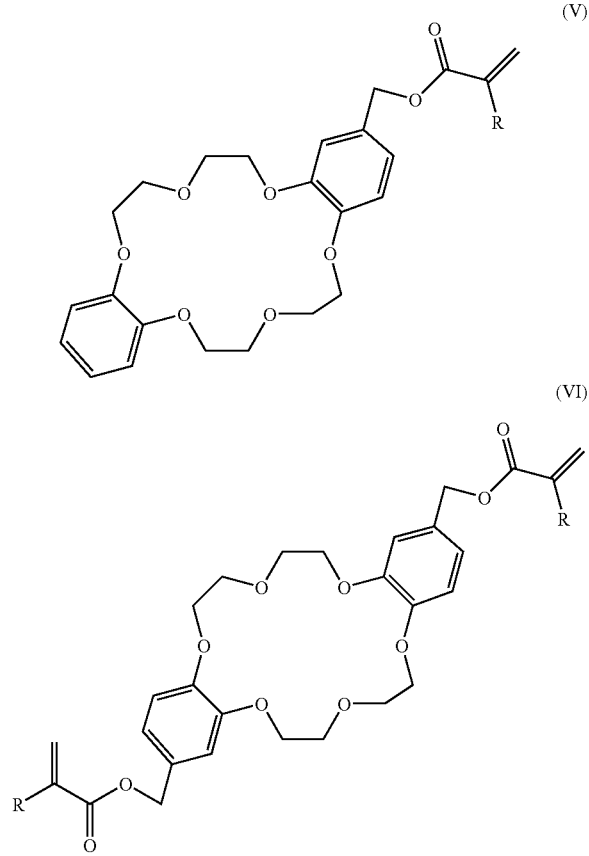

wherein R is hydrogen or methyl. Other polymerizable groups can be attached to the crown ethers by employing methods known in the art, as will be disclosed below. Other non-limiting examples include polymerizable crown ethers having 4, 5, 6, 7, 8, 9, or 10 oxygen atoms.

In one aspect, a crown ether includable in a polymeric material of the present invention can have one or more substituents that are aromatic, such as benzo- or dibenzo-crown ethers, heteroaromatic, particularly derivatives of pyridine, heterocyclic non-aromatic cyclic rings containing oxygen, sulfur or nitrogen, such as tetrahydrofuran, piperidine and pyrrolidine, alicyclic substituents, saturated carbon rings such as cyclopentane and cyclohexane, aliphatic substituents, and the like (see; e.g., Christensen et al., *Chem. Rev.*, 74:351 (1974); Lindoy, *Chem. Soc. Rev.*, 4:421 (1975); Bradshaw et al., *J. Heterocycl. Chem.*, 11:649 (1974); Christensen et al., *Science*, 174:459 (1971); and Pedersen et al., *Angew. Chem. int. Ed. Engl.*, 11:16 (1972)). Many such crown ethers are either commercially available or may be synthesized using techniques that are well known in the art.

In another aspect, one or more of the oxygen atoms in the macrocyclic ring of a crown ether includable in a polymeric material of the present invention may be substituted by nitrogen, sulfur, phosphorous, or combinations thereof. In one aspect, fewer than all oxygen atoms are substituted.

In still another aspect, crown ethers employed in the present invention are capable of forming a complex with at least one cationic species present in an ocular environment, the transport of which through the cornea is necessary for maintaining the health of the same. In one embodiment, such cationic species include $Na^+$ and $K^+$.

A variety of monomers can be chosen for the first monomer of a polymeric material of the present invention, which can be a hydrophobic or hydrophilic monomer, or a combination thereof. Non-limiting examples of hydrophobic and hydrophilic monomers are disclosed below. The first monomer can comprise from about 5 to about 95 percent (by weight) of a polymeric material of the present invention comprises, and the linear or cyclic poly(ethylene oxide)-containing monomer can comprise from about 5 to 95 (by weight) of the polymeric material. Alternatively, either type of monomer can comprise from about 10 to about 70, or from about 10 to about 50, or from about 10 to 30 percent (by weight) of the polymeric material. The composition can be chosen to achieve the desired oxygen permeability and ion and water transport rates in the final polymeric material.

In one aspect, the first monomer is a siloxane-containing monomer. Applicable siloxane-containing monomeric units for use in the formation of silicone-containing medical device, such as an ophthalmic device, are known in the art and numerous examples are provided, for example, in U.S. Pat. Nos. 4,136,250; 4,153,641; 4,740,533; 5,034,461; 5,070,215; 5,260,000; 5,310,779; and 5,358,995, which are incorporated herein by reference.

Non-limiting examples of applicable siloxane-containing monomeric units for producing medical devices are now presented. Such exemplary siloxane-containing monomers include bulky polysiloxanylalkyl(meth)acrylic monomers. The term "(meth)acrylic" means methacrylic or acrylic. An example of bulky polysiloxanylalkyl(meth)acrylic monomers are represented by the following Formula VII:

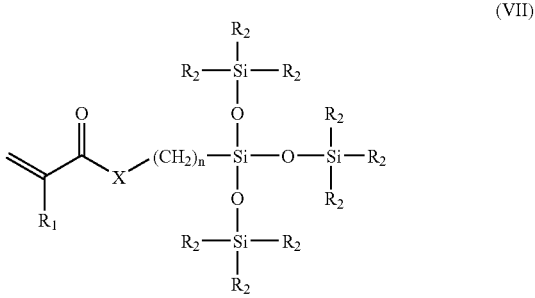

(VII)

wherein X denotes —O— or —NR—; each $R_1$ independently denotes hydrogen or methyl; each $R_2$ independently denotes a lower alkyl radical, phenyl radical or a group represented by

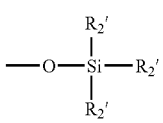

wherein each $R'_2$ independently denotes a lower alkyl or phenyl radical; and h is from 1 to 10. Examples of $R'_2$ are methyl, ethyl, propyl, butyl, isobutyl, pentyl, isopentyl, or hexyl radical.

A suitable bulky monomer is 3-methacryloxypropyltris (trimethyl-siloxy)silane or tris(trimethylsiloxy)silylpropyl methacrylate ("TRIS").

Another class of representative silicon-containing monomers includes silicone-containing vinyl carbonate or vinyl carbamate monomers such as: 1,3-bis{(4-vinyloxycarbonyloxy)but-1-yl}tetramethyldisiloxane; 3-(trimethylsilyl)propyl vinyl carbonate; 3-(vinyloxycarbonylthio)propyl{tris(trimethylsiloxy)silane}; 3-{tris(trimethylsiloxy)silyl}propyl vinyl carbamate; 3-{tris(trimethylsiloxy)silyl}propyl allyl carbamate; 3-{tris(trimethylsiloxy)silyl}propyl vinyl carbonate; t-butyldimethylsiloxyethyl vinyl carbonate; trimethylsilylethyl vinyl carbonate; and trimethylsilylmethyl vinyl carbonate.

An example of silicon-containing vinyl carbonate or vinyl carbamate monomers are represented by Formula VIII:

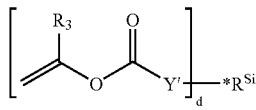
(VIII)

wherein:

Y' denotes —O—, —S— or —NH—;
$R^{si}$ denotes a silicon-containing organic radical;
$R_3$ denotes hydrogen or methyl; and
d is 1, 2, 3 or 4.

Suitable silicon-containing organic radicals $R^{si}$ include the following:

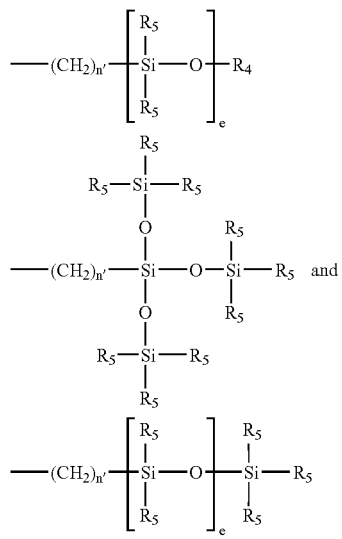

wherein $R_4$ denotes

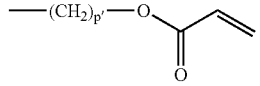

wherein p' is from 1 to and including 6;

$R_5$ denotes an alkyl radical or a fluoroalkyl radical having from 1 to and including 6 carbon atoms;

e is 1 to 200; n' is 1, 2, 3 or 4; and m' is 0, 1, 2, 3, 4 or 5.

An example of a particular species within Formula IV is represented by Formula IX.

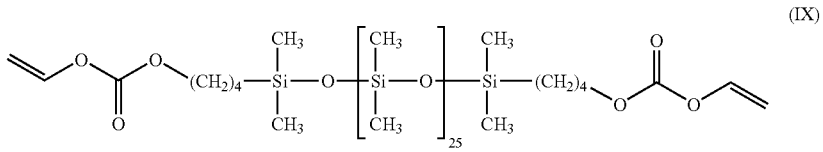
(IX)

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacrylates in Polyurethane-Polysiloxane Hydrogels," *Journal of Applied Polymer Science*, Vol. 60, 1193-1199 (1996). PCT Published Application No. WO 96/31792 discloses examples of such monomers, which disclosure is hereby incorporated by reference in its entirety. Further examples of silicone urethane monomers are represented by Formulae X and XI:

$$E(*D*A*D*J)_a*D*A*D*E' \quad (X)$$

or $$E(*D*J*D*A)_a*D*G*D*E' \quad (XI),$$

wherein:

D denotes an alkyl diradical, an alkyl cycloalkyl diradical, a cycloalkyl diradical, an aryl diradical or an alkylaryl diradical having 6 to 30 carbon atoms;

J denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureylene linkage;

a is at least 1;

A denotes a divalent polymeric radical of Formula XII:

$$\text{E}-(\text{CH}_2)_{m'}-\left[\begin{array}{c}R_s\\|\\ \text{Si}\\|\\R_s\end{array}-\text{O}\right]_t\begin{array}{c}R_s\\|\\ \text{Si}\\|\\R_s\end{array}-(\text{CH}_2)_{m'}-\text{E} \quad \text{(XII)}$$

wherein:
each $R_s$ independently denotes an alkyl or fluoro-substituted alkyl group
having 1 to 10 carbon atoms which may contain ether linkages between carbon atoms;
m' is at least 1; and
t is a number which provides a moiety weight of 400 to 10,000;
each of E and E' independently denotes a polymerizable unsaturated organic radical represented by Formula XIII:

$$\begin{array}{c}R_6\\R_7\diagdown\\ \phantom{R_7}\diagup\text{C}=\text{C}-(\text{CH}_2)_w-(X)_x-(Z)_z-(Ar)_y-R_8-\\R_7\end{array} \quad \text{(XIII)}$$

wherein:
$R_6$ is hydrogen or methyl;
$R_7$ is hydrogen, an alkyl radical having from 1 to and including 6 carbon atoms, or a —CO—Y—$R_9$ radical wherein Y is —O—, —S— or —NH—;
$R_8$ is a divalent alkylene radical having from 1 to and including 10 carbon atoms;
$R_9$ is a alkyl radical having from 1 to and including 12 carbon atoms;
X denotes —CO— or —OCO—;
Z denotes —O— or —NH—;
Ar denotes a substituted or unsubstituted aromatic radical having from 6 to and including 30 carbon atoms;
w is from 0 to and including 6; x is 0 or 1; y is 0 or 1; and z is 0 or 1.

A more specific example of a silicone-containing urethane monomer is represented by Formula XIV:

group, such as the diradical of isophorone diisocyanate, and each E" is a group represented by:

$$\text{CH}_2=\text{C}(\text{CH}_3)-\text{C}(=\text{O})-\text{O}-\text{CH}_2\text{CH}_2-$$

A preferred silicone hydrogel material comprises (in the bulk monomer mixture that is copolymerized) 5 to 50 percent, preferably 10 to 25, by weight of one or more silicone macromonomers, 5 to 75 percent, preferably 30 to 60 percent, by weight of one or more polysiloxanylalkyl(meth)acrylic monomers, and 10 to 50 percent, preferably 20 to 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 to Deichert et al. discloses additional unsaturated groups, including acryloxy or methacryloxy. Fumarate-containing materials such as those taught in U.S. Pat. Nos. 5,512,205; 5,449,729; and 5,310,779 to Lai are also useful substrates in accordance with the invention. These patents are incorporated herein by reference. Preferably, the silane macromonomer is a silicon-containing vinyl carbonate or vinyl carbamate or a polyurethane-polysiloxane having one or more hard-soft-hard blocks and end-capped with a hydrophilic monomer.

In particular regard to contact lenses, the fluorination of certain monomers used in the formation of silicone hydrogels has been indicated to reduce the accumulation of deposits on contact lenses made therefrom, as described in U.S. Pat. Nos. 4,954,587, 5,079,319 and 5,010,141, which are incorporated herein by reference. Moreover, the use of siloxane-containing monomers having certain fluorinated side groups (e.g., —$(CF_2)_x$—H, wherein x is an integer, such as from 1 to 10) have been found to improve compatibility between the hydrophilic and siloxane-containing monomeric units, as described in U.S. Pat. Nos. 5,387,662 and 5,321,108.

In another aspect, a polymeric material of the present invention comprises an additional monomer selected from the group consisting of hydrophilic monomers and hydrophobic monomers.

$$\text{E''} \left[ \begin{array}{c} \text{OCN(H)}-R_{10}-\text{NCOCH}_2\text{CH}_2\text{OCH}_2\text{CH}_2\text{OCN(H)}-R_{10}-\text{NCO(CH}_2)_m \left(\begin{array}{c}\text{CH}_3\\|\\ \text{Si}-\text{O}\\|\\ \text{CH}_3\end{array}\right)_p \begin{array}{c}\text{CH}_3\\|\\ \text{Si}-(\text{CH}_2)_m\\|\\ \text{CH}_3\end{array} \end{array} \right]_a \quad \text{(XIV)}$$
$$\text{E''}-\text{OCN(H)}-R_{10}-\text{NCOCH}_2\text{CH}_2\text{OCH}_2\text{CH}_2\text{OCN(H)}-R_{10}-\text{NCO}-$$

wherein m is at least 1 and is preferably 3 or 4, a is at least 1 and preferably is 1, p is a number which provides a moiety weight of 400 to 10,000 and is preferably at least 30, $R_{10}$ is a diradical of a diisocyanate after removal of the isocyanate Hydrophilic monomers can be nonionic monomers, such as 2-hydroxyethyl methacrylate ("HEMA"), 2-hydroxyethyl acrylate ("HEA"), 2-(2-ethoxyethoxy)ethyl(meth)acrylate, glyceryl(meth)acrylate, polyethylene glycol(meth)acrylate, tetrahydrofurfuryl(meth)acrylate, (meth)acrylamide, N,N'-dimethylmethacrylamide, N,N'-dimethylacrylamide, N-vinyl-2-pyrrolidone (or other N-vinyl lactams), N-vinyl acetamide, and combinations thereof. Other hydrophilic monomers can have more than one polymerizable group, such as tetraethylene glycol(meth)acrylate, triethylene glycol (meth)acrylate, tripropylene glycol(meth)acrylate, ethoxylated bisphenol-A (meth)acrylate, pentaerythritol(meth)acrylate, pentaerythritol(meth)acrylate, ditrimethylolpropane(meth)acrylate, ethoxylated trimethylolpropane(meth)acrylate, dipentaerythritol(meth)acrylate, alkoxylated glyceryl(meth)acrylate. Still further examples of hydrophilic monomers are the vinyl carbonate and vinyl carbamate monomers disclosed in U.S. Pat. No. 5,070,215, and the hydrophilic oxazolone monomers disclosed in U.S. Pat. No. 4,910,277. The contents of these patents are incorporated herein by reference. The hydrophilic monomer also can be an anionic monomer, such as 2-methacryloyloxyethylsulfonate salts. Substituted anionic hydrophilic monomers, such as from acrylic and methacrylic acid, can also be utilized wherein the substituted group can be removed by a facile chemical process. Non-limiting examples of such substituted anionic hydrophilic monomers include trimethylsilyl esters of (meth)acrylic acid, which are hydrolyzed to regenerate an anionic carboxyl group. The hydrophilic monomer also can be a cationic monomer selected from the group consisting of 3-methacrylamidopropyl-N,N,N-trimethyammonium salts, 2-methacryloyloxyethyl-N,N,N-trimethylammonium salts, and amine-containing monomers, such as 3-methacrylamidopropyl-N,N-dimethyl amine. Other suitable hydrophilic monomers will be apparent to one skilled in the art.

Non-limiting examples of hydrophobic monomers are $C_1$-$C_{20}$ alkyl and $C_3$-$C_{20}$ cycloalkyl(meth)acrylates, substituted and unsubstituted aryl (meth)acrylates (wherein the aryl group comprises 6 to 36 carbon atoms), (meth)acrylonitrile, styrene, lower alkyl styrene, lower alkyl vinyl ethers, and $C_2$-$C_{10}$ perfluoroalkyl(meth)acrylates and correspondingly partially fluorinated(meth)acrylates.

In one embodiment, a polymeric material of the present invention comprises a siloxane-containing monomer; a linear poly(ethylene oxide), cyclic poly(ethylene oxide), or combinations thereof; and a hydrophilic monomer, each being selected from the species disclosed above, and each being present in an amount in the range from 5 to 60 percent (by weight).

In another embodiment, a polymeric material of the present invention comprises a siloxane-containing monomer; a linear poly(ethylene oxide), cyclic poly(ethylene oxide), or combinations thereof; and a hydrophobic monomer, each being selected from the species disclosed above, and each being present in an amount in the range from 5 to 60 percent (by weight).

In another embodiment, a polymeric material of the present invention comprises a siloxane-containing monomer; a linear poly(ethylene oxide), cyclic poly(ethylene oxide), or combinations thereof; a hydrophilic monomer, and a hydrophobic monomer, each being selected from the species disclosed above, and each being present in an amount in the range from 5 to 60 percent (by weight).

An ophthalmic device, such as a contact lens, comprising a polymeric material of the present invention can have an equilibrium water content from about 5 to about 80, or from about 10 to about 60, or from 20 to about 60 percent; an oxygen permeability (Dk) greater than about 50, or 70, or 80, or 100 barrers. In addition, such an ophthalmic device is expected to have cation transport rates higher than those of prior-art devices that do not comprise a linear or cyclic poly(ethylene oxide) disclosed herein.

A polymeric material of the present invention can comprise units of one or more materials selected from the group of crosslinking agents, strengthening agents, and/or ultraviolet ("UV") absorbers. In addition, in carrying out a polymerization of the materials of the present invention, one or more polymerization initiators are desirably included in a starting mixture.

Non-limiting examples of suitable crosslinking agents include ethylene glycol dimethacrylate ("EGDMA"); diethylene glycol dimethacrylate; ethylene glycol diacrylate; triethylene glycol dimethacrylate; triethylene diacrylate; allyl methacrylates; allyl acrylates; 1,3-propanediol dimethacrylate; 1,3-propanediol diacrylate; 1,6-hexanediol dimethacrylate; 1,6-hexanediol diacrylate; 1,4-butanediol dimethacrylate; 1,4-butanediol diacrylate; trimethylolpropane trimethacrylate ("TMPTMA"); glycerol trimethacrylate; poly(ethyleneoxide mono- and di-acrylate); N,N'-dihydroxyethylene bisacrylamide; diallyl phthalate; triallyl cyanurate; divinylbenzene; ethylene glycol divinyl ether; N,N-methylene-bis-(meth)acrylamide; divinylbenzene; divinylsulfone; and the like.

Although not required, polymeric materials within the scope of the present invention may optionally have one or more strengthening agents added prior to polymerization, preferably in quantities of less than about 80 weight percent, but more typically from about 10 to about 60 weight percent, or from about 10 to about 30 weight percent. Non-limiting examples of suitable strengthening agents are described in U.S. Pat. Nos. 4,327,203; 4,355,147; and 5,270,418; each of which is incorporated herein in its entirety by reference. Specific examples, not intended to be limiting, of such strengthening agents include cycloalkyl acrylates and methacrylates; e.g., tert-butylcyclohexyl methacrylate and isopropylcyclopentyl acrylate.

Suitable UV light absorbers for use in the present invention include for example, but are not limited to, β-(4-benzotriazoyl-3-hydroxyphenoxy)ethyl acrylate; 4-(2-acryloxyethoxy)-2-hydroxybenzophenone; 4-methacryloyloxy-2-hydroxybenzophenone; 2-(2'-methacryloyloxy-5'-methylphenyl)benzotriazole; 2-(2'-hydroxy-5'-methacryloxyethylphenyl)-2H-benzotriazole; 2-[3'-tert-butyl-2'-hydroxy-5'-(3"-methacryloyloxypropyl)phenyl]-5-chlorobenzotriazole; 2-(3'-tert-butyl-5'-(3"-dimethylvinylsilylpropoxy)-2'-hydroxyphenyl]-5-methoxybenzotriazole; 2-(3'-allyl-2'-hydroxy-5'-methylphenyl)benzotriazole; 2-[3'-tert-butyl-2'-hydroxy-5'-(3"-methacryloyloxypropoxy)phenyl]-5-methoxybenzotriazole, and 2-[3'-tert-butyl-2'-hydroxy-5'-(3"-methacryloyloxypropoxy)phenyl]-5-chlorobenzotriazole. Preferably, the UV light absorber also has a polymerizable functional group. In one embodiment, the preferred UV light absorbers are β-(4-benzotriazoyl-3-hydroxyphenoxy)ethyl acrylate and 2-[3'-tert-butyl-2'-hydroxy-5'-(3"-methacryloyloxypropoxy)phenyl]-5-chlorobenzotriazole.

One or more suitable free radical polymerization initiators may be desirably added to the copolymers of the present invention. These initiators include thermal polymerization initiators and photopolymerization initiators. Thermal polymerization initiators include organic peroxy compounds and azobis(organonitrile) compounds. Non-limiting examples of suitable organic peroxy compounds include peroxymonocarbonate esters, such as tert-butylperoxy isopropyl carbonate; peroxydicarbonate esters, such as di(2-ethyl hexyl)peroxydicarbonate, di(sec-butyl)peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide. Non-limiting examples of suitable azobis(organonitrile) compounds include azobis (isobutyronitrile); 2,2'-azobis(2,4-dimethylpentanenitrile); 1,1'-azobiscyclohexanecarbonitrile; and azobis(2,4-dimethylvaleronitrile); and mixtures thereof. Preferably, such an initiator is employed in a concentration of approximately 0.01 to 1 percent by weight of the total monomer mixture.

Representative UV photopolymerization initiators include those known in the field, such as the classes of benzophenone and its derivatives, benzoin ethers, and phosphine oxides. Some non-limiting examples of these initiators are benzophenone; 4,4'-bis(dimethylamino)benzophenone; 4,4'-dihydroxybenzophenone; 2,2-diethoxyacetophenone; 2,2-dimethoxy-2-phenylacetophenone; 4-(dimethylamino) benzophenone; 2,5-dimethyl benzophenone; 3,4-dimethybenzophenone; 4'-ethoxyacetophenone; 3'-hydroxyacetophenone; 4'-hydroxyacetophenone; 3-hydroxybenzophenone; 4-hydroxybenzophenone; 1-hydroxycyclohexylphenylketone; 2-hydroxy-2-methylpropiophenone; 2-methylbenzophenone; 3-methylbenzophenone; 4'-phenoxyacetophenone; 2-methyl-4'-(methylthio)-2-morpholinopropiophenone; benzoin methyl ether; benzoin ethyl ether; diphenyl(2,4,6-trimethylbenzoyl)phosphine oxide. These initiators are commercially available. Other photo polymerization initiators are known under the trade names Darocur™ and Irgacure™, such as Darocur™ 1173 (2-hydroxy-2-methyl-1-phenyl-1-propanone), Irgacure™ 651 (2,2-dimethoxy-2-phenylacetophenone), Irgacure™ 819 (phenyl-bis(2,4,6-trimethylbenzoyl)phosphine oxide), and Irgacure™ 184 (1-hydroxycyclohexylphenylketone) from Ciba-Geigy, Basel, Switzerland. Other desirable photopolymerization initiators are those activatable by visible light, for example, blue light.

Methods of making exemplary crown ethers having polymerizable groups are now disclosed.

In one embodiment, 15-crown-5 having a methacrylate polymerizable group can be synthesized in a method similar to that disclosed by P. Tiemblo et al., *Polymer*, 44:6773 (2003) and presented in Scheme 1.

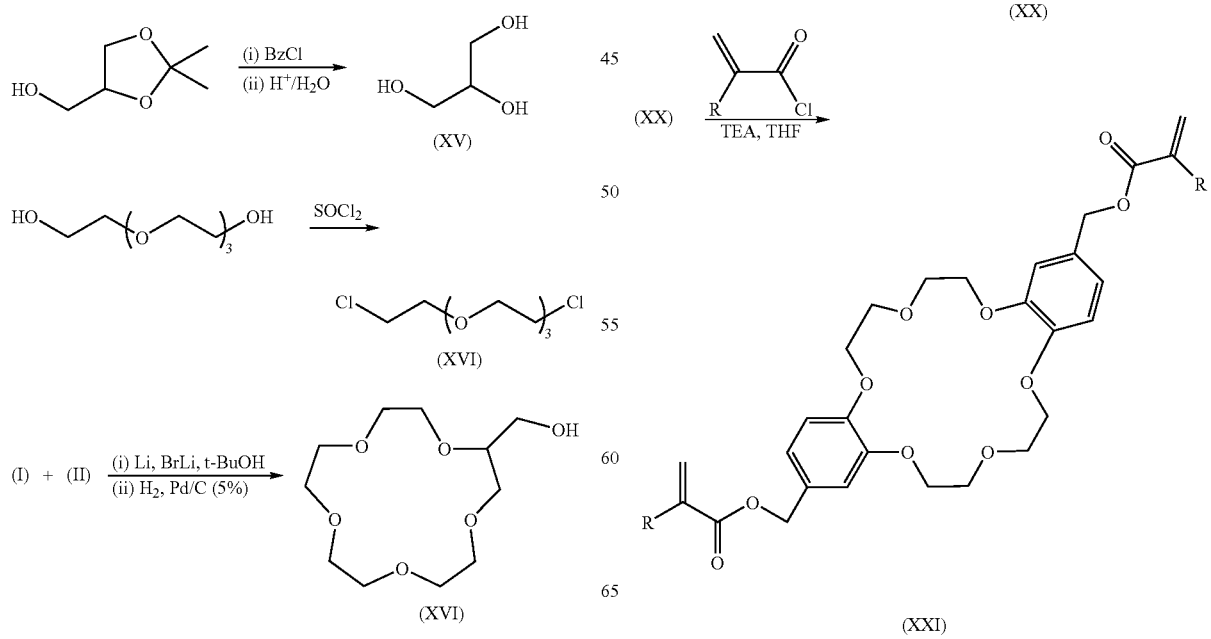

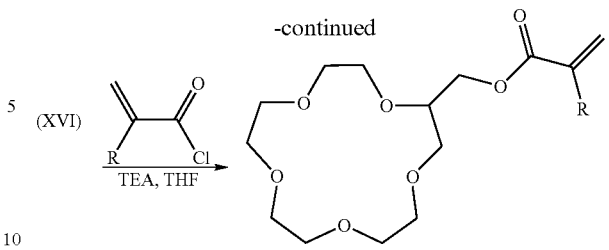

wherein BzCl is benzyl chloride, TEA is triethylamine, THF is tetrahydrofuran, and R is hydrogen or methyl.

Dibenzo-18-crown-6 dimethacrylate can be synthesized according to Scheme 2.

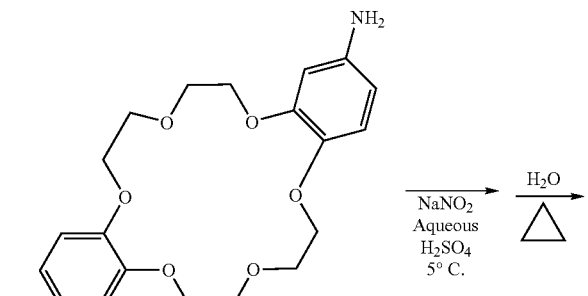

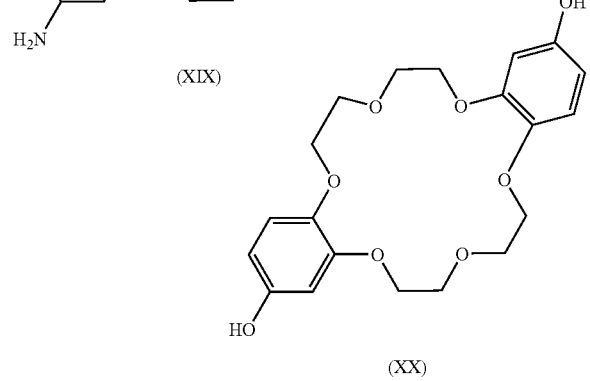

wherein R is hydrogen or methyl. Compound XIX is commercially available, e.g., from Sigma-Aldrich.

In another example, dibenzo-18-crown-6 dimethacrylamide can be synthesized according to Scheme 3.

Scheme 3

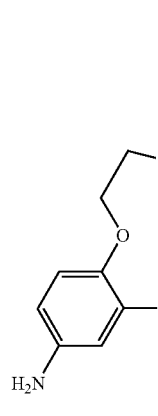

(XIX)

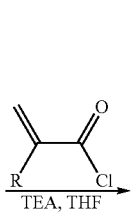

TEA, THF

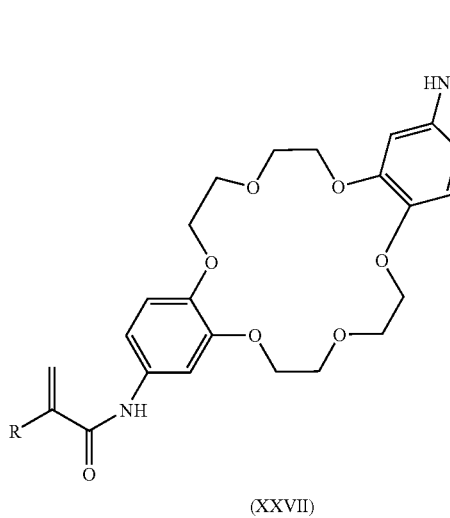

(XXVII)

wherein R is hydrogen or methyl.

In another example, 2-glycidyloxymethyl-18-crown-6 can be prepared according to Scheme 4.

Scheme 4

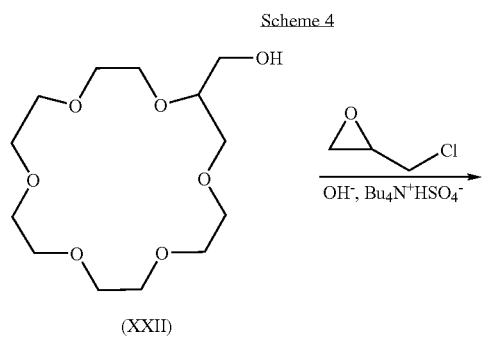

(XXII)

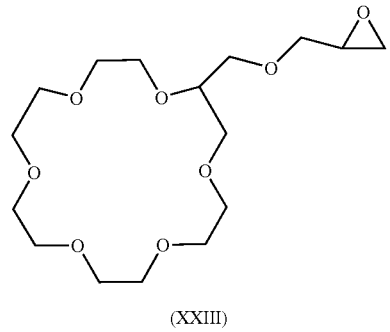

(XXIII)

Compound (XXII) is commercially available, for example, from Sigma-Aldrich.

In another example, 2-vinyl-18-crown-6 can be prepared according to Scheme 5, which is adapted from a method shown in G. W. McDaniel et al., *J. Heterocyclic Chem.*, 26:413 (1989).

Scheme 5

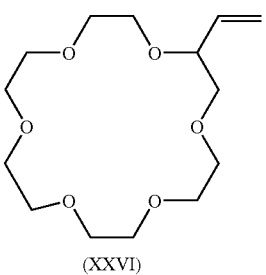

(XXVI)

wherein Ts is the tosylate group. 1,2-Epoxy-3-butene and triethylene glycol ditosylate (XXV) are commercially available; e.g., from Sigma-Aldrich. 2-Vinyl-18-crown 6 (Formula XXVI) can be radically copolymerized with other methacrylate monomers. A block homopolymer of 2-vinyl-18-crown-6 can be prepared using a cationic initiator.

Alternative methods for synthesizing crown ethers having polymerizable groups attached are taught in, for example, J. E. Herweh, *J. Polymer Sci.*, 23:2767 (1985); G. W. McDaniel et al., *J. Heterocyclic Chem.*, 26:413 (1989); I. Ikeda, *J. Org. Chem.*, 45:5355 (1980), and U.S. Pat. No. 5,028,721. People having skill in the art can adapt these methods to produce crown ethers having different number of oxygen atoms and different polymerizable groups.

In another aspect, the present invention also provides a method for making a polymeric material that has an improved oxygen permeability and ion and water transport rates. The method comprises polymerizing units of a first monomer with units of a polymerizable linear poly(ethylene oxide), cyclic poly(ethylene oxide), or combinations thereof. In one aspect, the polymeric material has an oxygen permeability greater than about 60 barrers. In one embodiment, the first monomer is a siloxane-containing polymerizable compound. Alternative embodiments of the polymeric materials have oxygen permeability greater than about 70, 80, or 90 barrers. A polymeric material of the present invention has ion and water transport rates greater than those of a material that does not comprise a linear or cyclic poly(ethylene oxide), exemplary structures of which are disclosed above.

In another aspect, the method comprises making a polymeric material comprising blocks of units of a first monomer and blocks of units of a second monomer, which is selected from linear poly(ethylene oxide), cyclic poly(ethylene oxide), or combinations thereof. The method comprises: (a) preparing a first prepolymer having units of the first monomer; (b) preparing a second prepolymer having units of the second monomer; and (c) polymerizing the first prepolymer with the second prepolymer to provide a polymeric material having an improved oxygen permeability and ion and water transport rates, wherein the first and second prepolymers have polymerizable terminals. In one embodiment, the first monomer is a siloxane-containing polymerizable compound. Alternatively, the method comprises: (a) polymerizing units of the first monomer to produce a first block; and (b) adding a second monomer to the first block to produce a polymeric material comprising the first block and a second block comprising units of the second monomer.

In yet another aspect, a method of making a medical device comprises: (a) disposing a composition comprising a first monomer and a polymerizable linear poly(ethylene oxide), cyclic poly(ethylene oxide), or combinations thereof in a mold, which has a cavity having a shape of the medical device; and (b) polymerizing the composition to form the medical device. The medical device thus formed can then be removed from the cavity of the mold. In one embodiment of the method, the composition comprises: (a) a first prepolymer comprising the first monomer; and (b) a second prepolymer comprising units of a polymerizable linear poly(ethylene oxide), cyclic poly(ethylene oxide), or combinations thereof.

In still another aspect, a method of making a medical device comprises: (a) forming a solid block of a polymeric material comprising a first monomer and a polymerizable linear poly(ethylene oxide), cyclic poly(ethylene oxide), or combinations thereof; and (b) shaping the block to form the medical device. In one embodiment of the method, the step of shaping comprises: (a) cutting the block into wafers; and (b) machining or lathing the wafer into the form of the medical device.

In some embodiments, the step of polymerizing a composition comprising the first monomer and the polymerizable linear poly(ethylene oxide), cyclic poly(ethylene oxide), or combinations thereof is carried out at a temperature from about ambient temperature to about 120° C., or from about ambient temperature to about 100° C., in the presence of a thermal polymerization initiator. Alternatively, the step of polymerization can be carried out under irradiation, for example, UV or visible-light irradiation.

The first monomer and the linear and cyclic poly(ethylene oxide) are selected from among those disclosed above.

Polymeric materials of the present invention are advantageously used in the manufacture of ophthalmic devices, such as contact lenses, corneal inlays, intraocular lenses, and keroprotheses.

Methods of using such ophthalmic devices are well known. For example, in a surgical cataract procedure, an incision is placed in the cornea of an eye. Through the corneal incision the cataractous natural lens of the eye is removed (aphakic application) and an IOL is inserted into the anterior chamber, posterior chamber or lens capsule of the eye prior to closing the incision. However, the subject ophthalmic devices may likewise be used in accordance with other surgical procedures known to those skilled in the field of ophthalmology.

EXAMPLE 1

Synthesis of 2-Methacryloyloxymethyl-18-crown-6

This synthesis is adapted from a method disclosed by J. E. Herweh, *J. Polymer Sci.*, 23:2767, 2769 (1985). 2-Hydroxymethyl-18-crown-6 (25 g, 0.33 mol, available from Sigma-Aldrich) and 1280 ml of dry DMF are quickly added to a flame-dried round-bottom flask under nitrogen purge. Dry benzene (650 ml) and triethylamine ("TEA") (67 g, 0.66 mol) are added, and the mixture is stirred and cooled to about 25° C., under nitrogen atmosphere. A solution of freshly distilled methacryloyl chloride (4.1 g, 39 mmol) in 10 ml of dry benzene is added in 5 minutes with stirring and cooling in ice water. After 24 hours at room temperature, the solvent is distilled off, and 2-methacryloyloxymethyl-18-crown-6 is recovered and purified.

EXAMPLE 2

Synthesis of 2-Glycidyloxymethyl-18-crown-6

This synthesis is adapted from a method disclosed in U.S. Pat. No. 6,867,274, which teaches the functionalization of a diol with glycidyl group. In a one-liter Erlenmeyer flask, epichlorohydrin (270 g, 3 mol), aqueous NaOH (50% w/w) (240 g, 3 mol), and $Bu_4N^+HSO_4^-$ (5 g, as the catalyst) are combined at room temperature with magnetic stirring. A thermometer is placed in the flask to monitor the temperature during the reaction. To this flask, 2-hydroxymethyl-18-crown-6 (10.5 g, 0.3 mole, available from Sigma-Aldrich) is added dropwise slowly over 30 minutes. The reaction is very exotherthermic, and therefore, the temperature is maintained at 30-40° C. by controlling the addition rate of the crown ether compound as well as by cooling in an ice bath, as needed. At the end of the addition of the crown ether, the reaction flask is kept at 40° C. for about one hour. The flask is then allowed to cool to room temperature, then deionized water is added (200 ml). This mixture is then extracted with diethyl ether (3 times, 200 ml each), dried over $MgSO_4$, and concentrated in vacuo to obtain a crude product, which is further purified by distillation to obtained purified 2-glycidyloxymethyl-18-crown-6.

EXAMPLE 3

Production of Copolymer of TRIS And 2-Methacryloyloxymethyl-18-crown-6

To a one-liter round bottom flask under dry nitrogen purge are added 5 g of 2-methacryloyloxymethyl-18-crown-6, as prepared in Example 1, 5 g of TRIS, 0.05 g of Vazo 64™ (a thermal polymerization initiator, said to be 2,2'-azobisisobutyronitrile, DuPont Chemicals, Wilmington, Del.), and 50 ml of freshly distilled THF. The reaction mixture is heated to and kept at 80° C. for four hours, at which time the reaction solution is devolatilized under fine vacuum to remove THF, resulting in a copolymer of TRIS and 2-methacryloyloxymethyl-18-crown-6. After further rinsing and purifying, the copolymer is suitable for the manufacture of contact lenses.

While specific embodiments of the present invention have been described in the foregoing, it will be appreciated by those skilled in the art that many equivalents, modifications, substitutions, and variations may be made thereto without departing from the spirit and scope of the invention as defined in the appended claims.

What is claimed is:

1. A medical device comprising a polymeric material that comprises units of a first monomer and units of a second monomer, wherein the second monomer is selected from the group consisting of cyclic poly(ethylene oxide), and combinations of a cyclic poly(ethylene oxide) and linear poly(ethylene oxide), each having a polymerizable group.

2. The medical device of claim 1, wherein the first monomer is a siloxane-containing compound.

3. The medical device of claim 2, wherein the silicone-containing monomer is selected from the group consisting of polysiloxanylalkyl (meth)acrylic monomer, silicone-containing vinyl carbonate, silicone-containing vinyl carbarnate, and combinations thereof.

4. The medical device of claim 1, wherein the cyclic poly(ethylene oxide) is a crown ether having a number of oxygen atoms in a range from 4 to, and including, 10.

5. The medical device of claim 4, wherein the first monomer is a siloxane-containing compound.

6. The medical device of claim 5, wherein the first monomer is selected from the group consisting of polysiloxanylalkyl (meth)acrylic monomer, silicone-containing vinyl carbonate, silicone-containing vinyl carbamate, and combinations thereof.

7. The medical device of claim 1, wherein the polymeric material further comprises a material selected from the group consisting of UV absorbers, strengthening agents, crosslinking agents, and combinations thereof.

8. The medical device of claim 1, wherein the medical device is selected from the group consisting of contact lenses, corneal inlays, keroprotheses, and intraocular lenses.

9. The medical device of claim 8, wherein the medical device has an oxygen permeability greater than about 60 barrers, and ion and water transport rates greater than a medical device that comprises a similar material that is free of cyclic poly(ethylene oxide).

10. A method of making a medical device, the method comprising: (a) disposing in a mold a composition comprising a first monomer and a second monomer that is selected from polymerizable cyclic poly(ethylene oxide), and combinations of a cyclic poly(ethylene oxide) and linear poly(ethylene oxide), the mold having a cavity having a shape of the medical device; and (b) polymerize the composition to form the medical device.

11. The method of claim 10, wherein the first monomer comprises a siloxane-containing compound.

12. The medical device of claim 10, wherein the cyclic poly(ethylene oxide) is a crown ether having a number of oxygen atoms in a range from 4 to, and including, 10.

13. The medical device of claim 12, wherein the silicone-containing monomer is selected from the group consisting of polysiloxanylalkyl (meth)acrylic monomer, silicone-containing vinyl carbonate, silicone-combining vinyl carbamate, and combinations thereof.

14. The medical device of claim 12, wherein the medical device has an oxygen permeability greater than about 60 barrers.

15. A method of making a medical device the method comprising: (a) forming a solid block of a polymeric material comprising units of a first monomer and a second monomer that is selected from the group consisting of polymerizable cyclic poly(ethylene oxide), and combinations of a cyclic poly(ethylene oxide) and linear poly(ethylene oxide); and (b) shaping the block to form the medical device.

16. The method of claim 15, wherein the step of shaping comprises: (a) cutting the block into wafers; and (b) machining or lathing the wafer to form of the medical device.

17. The method of claim 15, wherein the first monomer comprises a siloxane-containing compound.

18. The medical device of claim 15, wherein the cyclic poly(ethylene oxide) is a crown ether having a number of oxygen atoms in a range from 4 to and including, 10.

19. The medical device of claim 18, wherein the silicone-containing monomer is selected from the group consisting of polysiloxanylalkyl (meth)acrylic monomer, silicone-containing vinyl carbonate, silicone-containing vinyl carbamate, and combinations thereof.

20. The medical device of claim 18, wherein the medical device has an oxygen permeability greater than about 60 barrers.

* * * * *